Patented Dec. 27, 1938

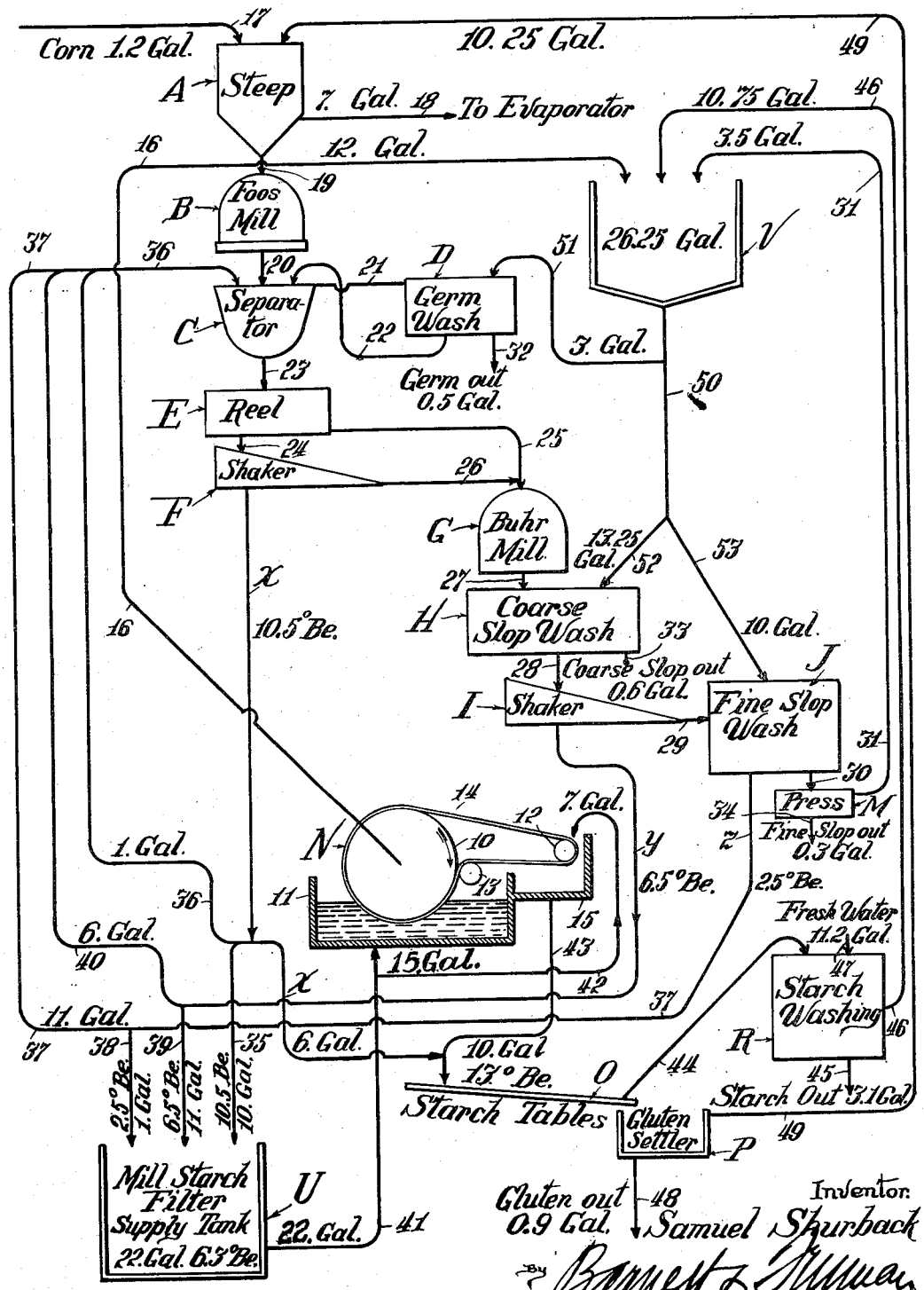

2,141,562

UNITED STATES PATENT OFFICE 2,141,562

MANUFACTURE OF STARCH

Samuel Shurback, North Kansas City, Mo., assignor, by mesne assignments, to Corn Products Refining Company, New York, N. Y., a corporation of New Jersey Application July 8, 1935, Serial No. 30,276

9 Claims. (Cl. 127—68)

This invention relates to the process of obtaining starch from corn, by the wet method, of the type in which all, or substantially all, of the process waters except the steep water draw-off and water absorbed in the solids, to wit the germ, slops, gluten and starch, are reused in the process for the purpose of saving solubles and preventing the pollution of streams through the discharge thereto of process waters.

The invention relates more particularly to the type of starch process disclosed in application of Frederick L. Jefferies for Manufacture of starch, Serial No. 668,095, filed April 26, 1933; according to which all or substantially all of the water used as a carrier for the solids in the separation of the gluten from the starch is returned to the operation of steeping the corn, so that little or none of this highly infected water has to be reused in the separating operations. One of the objects of the present invention is to adapt a process of this type for use with a vacuum filter employed for concentrating the mill starch delivered to the starch tables, or to the other means used for separating the gluten from the starch. Vacuum filters of the displacement type, such for example as the "string filters" in which the layer of solids on the vacuum drum are discharged by means of endless strings, operate efficiently only at certain densities of the starch, gluten and water mixture, constituting the "mill starch." The present invention, taking advantage of the fact that the separating operations result in three mill starch streams of quite different densities, that is, different contents of starch and gluten, proceeds upon the principle of combining mill starch from the three streams in such proportions as to give a density of the magma going to the filter which will insure maximum efficiency in the operation of such filter.

A further object is to so distribute the mill starch, the filtrate from the string filter (or other vacuum filter), and the wash water resulting from the washing of the starch with fresh water, so as to obtain the most effective density of the starch milk in the germ separators and the highest washing or separating efficiency in the germ, coarse slop and fine slop washes.

In the preferred operation of the process the major portion of the high density mill starch from the germ separation, goes to the string filter; the major portion of the low density mill starch from the fine slop wash goes to the germ separators; the mill starch from the coarse slop wash, of medium density, is distributed as between the string filter and the separators; the filtrate from the string filter and the starch wash water is used in the germ and slop washes; and the mill starch mixture sent to the string filter is divided, part going to feed the filter and the rest to dilute the solid material discharged from the filter, so that the mill starch stream delivered to the starch tables, or other means for separating the gluten from the starch, will have the proper density for such separating operation (the preferable density in the case of a tabling operation being about 13° Baumé) in order that all of the gluten settler water may be returned to the steeps and the steep water draw-off restricted to a practicable maximum of approximately seven gallons per bushel of corn ground.

It is noted that throughout the specification, the water quantities will be given in terms of gallons per bushel of corn ground.

The preferred process, in accordance with the principles of operation above set forth, is shown in the accompanying flow sheet drawing in which the means employed for carrying out the steps of the process are given reference letters as follows:

A indicates the steeps; B the Foos mills in which the steeped grain is broken up in order to free the germs; C the gravity germ separators; D the system of reels and/or shakers in which the germs separated at C are washed for removal of starch and gluten; E and F the reel and shaker, respectively, for separating from the grits the starch milk, which latter is discharged from the shaker through pipe $x$; G the Buhr mill for grinding the grits; H the system of reels and/or shakers constituting the coarse slop wash; I the shaker for separating from the fine slop the starch milk, which is discharged through pipe $y$; J the system of silk reels and/or shakers constituting the fine slop wash, the mill starch from which is discharged through pipe $z$; M the press for pressing the water out of the fine slop; N the filter for concentrating the mill starch delivered to the starch tables designated O; P the gluten settlers; R the filters or other means used for washing the starch taken from tables O; U a mill starch supply tank for the filter N; and V a supply tank for the light starch liquor distributed to the germ and slop washings.

The filter N is preferably a vacuum filter of the drum type, the drum being indicated at 10 and arranged to dip into the body of mill starch maintained, at the proper level, in the feed tank 11. Extending around the drum 10 and over sheaves 12 and 13 are a plurality of strings 14 which serve to discharge the layer of solid material on the drum into the discharge vessel 15 where the material is diluted to the proper density for tabling, as will be hereinafter described. The filtrate is discharged from the filter through pipe 16. Inasmuch as filters of this type are well-known, the diagrammatic showing of the filter given in the drawing is deemed sufficient.

The connecting pipes, troughs, conduits or conveyors, (for convenience referred to hereafter as pipes) will be identified by reference numerals in the description of the operation of the process which will now be given. In this description water quantities, in terms of gallons per bushel of corn ground, and densities will be given, so far as required for an understanding of the invention; these quantities being based upon a seven gallon draw-off of steep water and upon the assumption that all gluten settler water is to be returned to the steeps. Obviously these quantities are preferential and are not to be considered as limitations upon the invention.

The corn containing 1.2 gallons of water enters the steeps A through pipe 17. The steep water, 7 gallons, is discharged to the evaporators (not shown) through pipe 18, and the steeped corn is delivered through pipe 19 to the Foos mills B. The corn ground in mills B passes through pipe 20 to the separators C. The germs overflowing from the separators pass through pipe 21 to the germ wash D, the starch milk from the germ wash being returned to the separators through pipe 22. The grits from the separators pass through pipe 23 to reel E. The water from reel E passes through pipe 24 to shaker F, and the tailings from the reel and shaker pass through pipes 25, 26 to the Buhr mill G. The material ground in mill G passes through pipe 27 to the coarse slop wash, the mill starch from which goes through pipe 28 to shaker I. The tailings from the shaker I pass through pipe 29 to the fine slop wash J. The fine slop passes through pipe 30 to the press M, and the water from the press, 3.5 gallons, through pipe 31 to the supply vessel V.

The germs are discharged from the germ wash D at 32 and contain 0.5 gallon of water; the coarse slop is discharged at 33 from the coarse slop wash and contains 0.6 gallon of water; the fine slop is discharged from the press M at 34 and contains 0.3 gallon of water.

The mill starch in pipe $x$ from the germ system will have a density of approximately 10.5° Baumé. The mill starch from the coarse slop wash in pipe $y$ will have a density of approximately 6.5° Baumé. The mill starch from the fine slop wash in pipe $z$ will have a density of approximately 2.5° Baumé.

In order to best effectuate the purposes of the present invention the mill starch streams are divided, recombined and distributed in the following manner:

Of the 17 gallons of high density mill starch in $x$, 11 gallons are sent to the mill starch filter supply tank through pipe 35 except that occasionally 1 gallon is sent through pipe 36 to the separator C in which case the flow through 35 is reduced to 10 gallons; and 6 gallons of the $x$ stream are sent to the tables as hereinafter described. The stream 36 is a balancing stream, used or not, as required, to maintain the proper density of the liquid in the separators.

The major portion, 11 gallons, of the low gravity mill starch in $z$ is sent through pipe 37 to the separators C; 1 gallon, for adjustment, going, as needed, through pipe 38 to the mill starch filter supply tank U.

The medium density mill starch in $y$ is distributed as between the separators C and the filter supply tank U, 11 gallons going through pipe 39 to tank U and 6 gallons through pipe 40 to the separators.

This arrangement gives considerable flexibility to the process since the distribution, as between the separators C and the supply tank U for the string filter N may be varied so as to maintain the most effective density in the separators, which is about 9° Baumé and a relatively high density in the mill starch going to the string filter. This density for maximum efficiency should be at least 6° Baumé.

Of the mill starch in tank U (22 gallons at 6.3° Baumé), 15 gallons passes through pipe 41 to the feed tank 11 of filter N. The suction of the filter picks up the solids in this liquor and forms a layer of the same on the drum, which layer is stripped off by the strings 14 as the drum revolves and is discharged into the vessel 15. 7 gallons of mill starch from tank U passes through pipe 42 to the receiving vessel 15 of the filter N for diluting the solids delivered by the filter. The resultant starch liquor, 10 gallons, is mixed with 6 gallons of mill starch in the branch pipe $x'$ from line $x$, the mixture having, preferably, a density of 13° Baumé and being delivered to the table heads at this density.

The filter N extracts 12 gallons of water from the mill starch treated, and this water passes through pipe 16 to the supply vessel V.

It has been found that a vacuum filter of the type indicated at N does not operate efficiently with a low Baumé mixture of starch and gluten. The presence of the gluten, apparently, prevents the building up of a thick cake and the maintenance of a uniform high vacuum in the interior of the drum. By increasing the density to 6.0° Baumé, or higher, the proportion of starch to gluten per volume of liquid is increased so that the filter will operate efficiently. The filter N operates merely as a de-watering device, hence enough of the mill starch from U is carried round the filter and mixed with the solid material discharged from the filter to give a proper density to the mill starch delivered to the table heads.

The starch deposited on the tables O is removed therefrom, for example by flushing, and passes through pipe 44 to the starch washing apparatus R, from which the washed starch is discharged at 45 containing 3.1 gallons of water. The wash water from the starch washing operation, 10.75 gallons, passes through pipe 46 to the supply vessel V. 11.2 gallons of fresh water is introduced to the starch washing operation at 47.

The gluten and water tailing off from the starch tables O passes into the gluten settlers P where the gluten subsides, being ultimately discharged at 48 with a water content of 0.9 gallon. The gluten water 10.25 gallons from the settlers P passes through pipe 49 to the steeps A. The operation of settling the gluten in the settlers is one which requires several hours. It prolongs the process more than any other step, and conditions in the gluten settlers favor the development of micro-organisms, which if returned, with the gluten water to the system, will contaminate the starch. In accordance with the present invention all of the gluten settler water is returned to the steeps from which it is discharged to the evaporators, none being used for the germ, coarse slop or fine slop washes. These washes are supplied with water from the tank V, this water coming from the filter N and from the starch washing operation, with a small amount from the fine slop press. Its micro-organic content is relatively small. Pipe 50 leads from tank V and has a branch 51 taking 3 gallons to the germ wash D, a branch 52 taking 13.25 gallons to the coarse slop wash H, and a branch 53 taking 10 gallons to the fine slop wash J.

While full details have been given for operation of the process of the present invention according to preferred procedures, it will be understood that the invention is not limited to these details. It is the intention, on the contrary, to cover all modifications within the scope of the appended claims.

I claim:

1. In the process of obtaining starch from corn comprising: steeping and comminuting the corn; subjecting the material to operations for separating and washing the germs and slop yielding mill starch streams of different densities; treating mill starch to remove gluten and the major portion of the water therefrom; and re-using said last mentioned water for steeping corn, as the process is continued, the improvement which comprises: extracting water from a mill starch mixture of relatively high density before treating it for removal of gluten; and returning to the separating and washing operations mill starch mixture of relatively low density, without treatment, and the water extracted as aforesaid from the high density mill starch mixture whereby substantially all of the water removed from the mill starch with the gluten may be returned to the steeping operation.

2. In the process of obtaining starch from corn comprising: steeping and comminuting the corn; subjecting the material to operations for separating and washing the germs and slop yielding mill starch streams of different densities; treating mill starch to remove gluten and the major portion of the water therefrom; and re-using said last mentioned water for steeping corn, as the process is continued, the improvement which comprises: extracting water from a mill starch mixture of relatively high density before treating it for removal of gluten and re-using said water in said washing operations as the process is continued; and returning to the germ separating operation, without treatment, a mill starch mixture of relatively low density, whereby substantially all of the water removed from the mill starch with the gluten may be returned to the steeping operation.

3. In the process of obtaining starch from corn comprising: steeping and comminuting the corn; subjecting the material to germ separating and coarse and fine slop washing operations yielding mill starch streams of different densities; treating mill starch to remove gluten and the major portion of the water therefrom; and re-using said last mentioned water for steeping corn as the process is continued, the improvement which comprises: extracting water from a mixture containing the major portion of the high density mill starch from the germ separator and portions of the rest of the mill starch and returning the extracted water to the coarse and fine slop washes; and returning, without treatment, to the germ separating operation the major portion of the low density mill starch from the fine slop wash, whereby substantially all of the water removed from the mill starch with the gluten may be returned to the steeping operation.

4. In the process of obtaining starch from corn comprising: steeping and comminuting the corn; subjecting the material to germ separating and coarse and fine slop washing operations yielding mill starch streams of different densities; treating mill starch to remove gluten and the major portion of the water therefrom; and re-using said last mentioned water for steeping corn as the process is continued, the improvement which comprises: extracting water from a mixture containing the major portion of the high density mill starch from the germ separator and portions of the rest of the mill starch and returning the extracted water to the coarse and fine slop washes; returning, without treatment, to the germ separating operation the major portion of the low density mill starch from the fine slop wash; combining with the high density mill starch going to the filter part of the medium density mill starch from the coarse slop wash and returning the rest of said medium density mill starch with the low density mill starch to the germ separating operation, whereby substantially all of the water removed from the mill starch with the gluten may be returned to the steeping operation.

5. In the process of obtaining starch from corn comprising: steeping and comminuting the corn; subjecting the material to germ separating and coarse and fine slop washing operations yielding mill starch streams of different densities; treating mill starch to remove gluten and the major portion of the water therefrom; and re-using said last mentioned water for steeping corn as the process is continued, the improvement which comprises: extracting water from a mixture containing the major portion of the high density mill starch from the germ separator and portions of the rest of the mill starch and returning the extracted water to the coarse and fine slop wash; returning, without treatment, to the germ separating operation the major portion of the low density mill starch from the fine slop wash; and using part of the high density mill starch from the germ separation for diluting the aforesaid de-watered material, before treating it for removal of gluten.

6. In the process of obtaining starch from corn comprising: steeping and comminuting the corn; subjecting the material to germ separating and coarse and fine slop washing operations yielding mill starch streams of different densities; treating mill starch to remove gluten and the major portion of the water therefrom; and re-using said last mentioned water for steeping corn as the process is continued, the improvement which comprises: extracting water from a mixture containing the major portion of the high density mill starch from the germ separator and portions of the rest of the mill starch and returning the extracted water to the coarse and fine slop washes; returning, without treatment, to the germ separating operation the major portion of the low density mill starch from the fine slop wash; combining with the high density mill starch going to the filter part of the medium density mill starch from the coarse slop wash and returning the rest of said medium density mill starch with the low density mill starch to the germ separating operation; and using part of the mill starch from the germ separating operation and part of the mill starch from the coarse slop wash for diluting the aforesaid de-watered material before treating it for removal of gluten.

7. In the process of obtaining starch from corn comprising: steeping and comminuting the corn; subjecting the material to operations for separating and washing the germs and slop yielding mill starch streams of different densities; treating mill starch to remove gluten and the major portion of the water therefrom; and re-using said last mentioned water for steeping corn, as the process is continued, the improvement which comprises: extracting water from a mill starch mixture having a relatively high density; using mill starch mixture having a relatively high density for diluting the material de-watered as aforesaid before it is treated for removal of gluten; and returning, without treatment, to the process at a stage in advance of the de-watering stage a mill starch mixture of relatively low density.

8. In the process of obtaining starch from corn which comprises: subjecting the corn in a comminuted state to operations for separating and washing the germs and slop yielding mill starch streams of different densities; extracting water from the mill starch for re-use in the process; and tabling mill starch to remove gluten, the improvement which comprises: using a vacuum filter for extracting water from the mill starch and sending to said filter a mixture of said mill starch mixtures of different densities having a density of about 6° Baumé; and diluting the filter cake from the filters with mill starch in such amount and of such density to give a mill starch mixture for tabling having a density of about 13° Baumé.

9. In the process of obtaining starch from corn comprising: steeping and comminuting the corn; subjecting the material to operations for separating and washing the germs and slop, yielding mill starch streams of different densities; treating mill starch to remove gluten and the major portion of the water therefrom; and re-using said last mentioned water for steeping corn, as the process is continued on fresh material, the improvement which comprises: combining mill starch streams in such proportions to provide a mill starch mixture of substantially 6° Baumé; using a vacuum filter to extract water from a portion of the mixture; using another portion of said mixture for diluting the material dewatered as aforesaid before it is treated for removal of gluten; and returning, without treatment, to the process at a stage in advance of the dewatering stage the mill starch mixture of relatively low density.

SAMUEL SHURBACK.